Jan. 14, 1930.  V. F. HUTCHINS  1,743,352
LOCK FOR END GATES
Filed May 28, 1928

INVENTOR.
VERN F. HUTCHINS.
BY HIS ATTORNEYS.

Patented Jan. 14, 1930

1,743,352

UNITED STATES PATENT OFFICE

VERN F. HUTCHINS, OF MONTEVIDEO, MINNESOTA

LOCK FOR END GATES

Application filed May 28, 1928. Serial No. 280,991.

It is the object of this invention to provide a novel and improved lock for the end gates of wagon boxes and truck bodies which will securely and firmly releasably hold the end gate in place and will prevent the spreading of the sides of the wagon box or truck body.

To these ends the invention consists in the novel parts and novel combinations of parts, hereinafter defined in the claims and described in the following specification, made in connection with the accompanying drawings, wherein like reference characters refer to the same or similar parts throughout the various views and, in which, Fig. 1 is a view in rear elevation of a wagon box structure, including two end gates and illustrating two of the locks of the present invention applied thereto;

The term wagon box, as hereinafter used in the specification and claims, is intended to mean a wagon box for wagons, or a truck body, or any similar box having sides and an open end.

Figure 5:
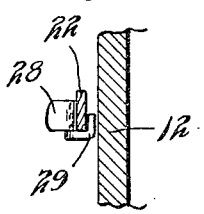
Fig. 5 is a vertical section on an enlarged scale taken on the line 5—5 of Fig. 1, as is indicated by the arrows.
Figure 3:
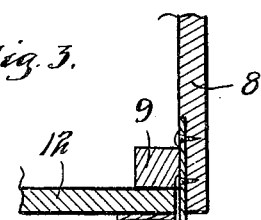
Fig. 3 is a horizontal section taken on an enlarged scale on the line 3—3 of Fig. 1, as is indicated by the arrows.
Figure 6:
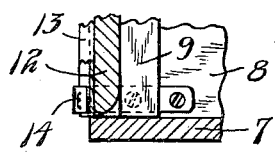
Fig. 6 is a vertical section on an enlarged scale taken on the line 6—6 of Fig. 1, as is indicated by the arrows.

Referring to the drawings, a rectangular wagon box A of standard construction is illustrated which includes the bottom 7, sides 8 and vertical posts 9, secured to the sides 8, adjacent the rear ends thereof, but spaced forwardly slightly from the rear ends. A bolster 10 extends transversely of the bottom 8 below the same adjacent the rear end. Suitable braces 11 are illustrated, secured to and extending between the outer ends of the bolster 10 and the sides 8. In accordance with the present invention, end gates 12 are provided and these end gates will be preferably two or more in number. They are of rectangular shape and are rounded at their lower inner edges as is illustrated in Fig. 6. The lower end gate 12 is adapted to fit between the sides 8 of the wagon box and to bear against the posts 9, so that the outer side of the end gate will be flush with the rear ends of the sides 8. The upper end gate will fit in a similar manner directly on top of the lower end gate 12. In the drawings, each of the end gates 12 is provided at either end of its rear side with vertically extending channel bars 13 and these bars extend throughout practically the entire height of the gates. It will be understood that any type of bar having a rearwardly extending flange may be substituted for the bars 13. Adjacent the lower ends of each of the gates 12, hooks 14 are secured to the inner sides of the sides 8 of the wagon box and these hooks are so formed that when the end gates are in place they will extend over and engage the outer flanges of the channel bars 13 adjacent the lower ends. Preferably, above the vertical center of the bars, notches 13ª are cut in the rearwardly extending flanges of the bars. Bolts 15 slidably fit within the notches 13ª and are held in place therein for travel, in substantially a horizontal plane only, by means of short bars 16 which are secured through the channel bars 13 to the end gates as by nutted bolts 17, and are held in spaced relation from the secured flanges of the channel bars 13 by means of washers 18 extending about the nutted bolts 17. The bolts 15, at their outer ends, are reversely bent to form hooks extending forwardly and inwardly from the outer ends of the bolts. Angle brackets 19, secured to the outer sides of the sides 8 of the wagon box, have outwardly projecting flanges over which the hooks of bolts 15 are adapted to fit, and notches 20 are formed in the outer ends of the angle brackets 19 for reception of the hooked ends of the bolts 15. The inner ends of the bolts 15 for each lock are respectively pivoted to links 21 and 22. The links 21 extend inwardly for some little distance and are then rearwardly offset and are pivotally connected at their inner ends by pivots 23 to an operating lever 24. Each lever 24 is pivotally mounted in a pivot 25 disposed substantially centrally of an end gate 12 and the lever is held in spaced relationship from the end gate, by means of a washer 26 extending about the pivot 25. The links 22 extend inwardly from their outer pivoted ends for some distance and are then provided with downwardly bowed arcuate portions adjacent their inner ends, and are pivoted at their extreme inner ends by pivots 27 to the lever 24. A pivot 27 and a pivot 23 will be disposed at opposite sides of each pivot 25 at preferably equal radial distances therefrom, so that the inner end of a link 21 will be pivotally secured to the lever 24 at the opposite side of the pivot 25 about which the lever may swing, from the point where the inner end of an arm 22 will be pivoted to the lever 24. The lever 24 extends straight outwardly some distance from the pivot 25 and its outer end is split, for a short distance, to form a rearwardly extending handle 28 at its upper side and a hook 29 at its lower side. The hook 29 extends forwardly and upwardly so that the outer end of the lever 24 may be hooked over the lower side of the link 22, as best illustrated in Fig. 5, to hold the lever in place when the end gates are locked.

Figure 1:
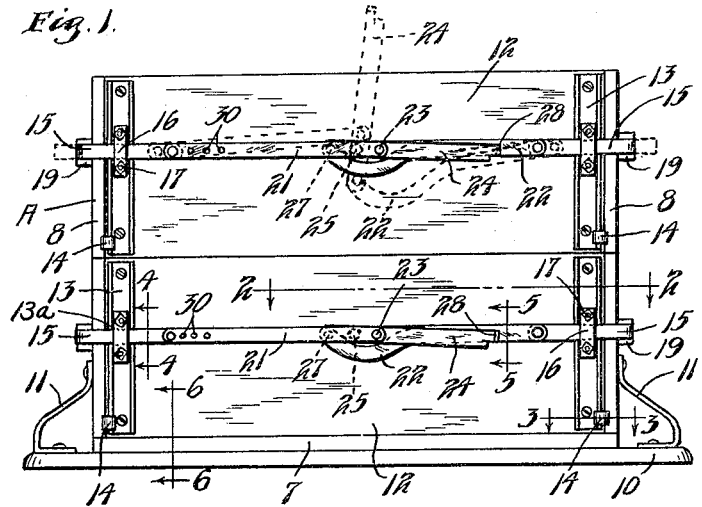
Figure 2:
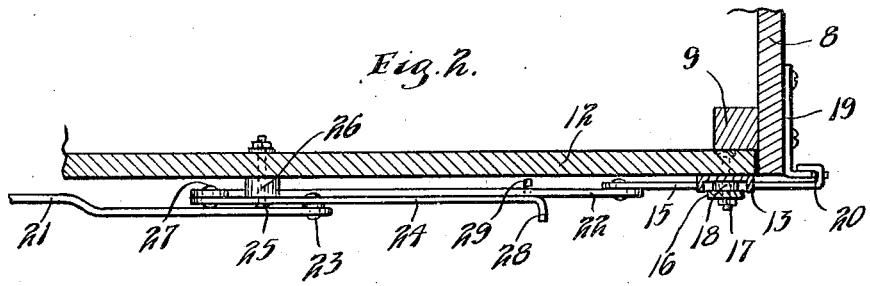
Fig. 2 is a horizontal section taken on an enlarged scale on the line 2—2 of Fig. 1, as is indicated by the arrows.
Figure 4:
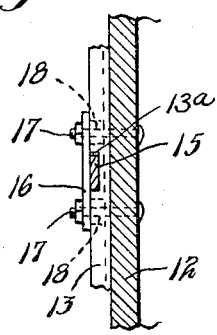
Fig. 4 is a vertical section on an enlarged scale taken on the line 4—4 of Fig. 1, as is indicated by the arrows.

Considering that the two end gates are locked in place in the manner illustrated in Fig. 1. When it becomes desirable to remove the upper end gate 12, handle 28 of lever 24 will be grasped and the lever will be swung downwardly and outwardly slightly to release the hook 29 from the link 22. The operating lever may then be swung from the position illustrated in full lines Fig. 1, to the position illustrated in dotted lines Fig. 1. This will cause the links 21 and 22 to force the bolts 15 outwardly from the ends of the end gate until the outer hooked ends of the bolts project laterally beyond the angle brackets 19. The upper end gate 12 may then be either pulled directly upwardly from the wagon box and removed or the upper edge of the upper end gate may be swung downwardly to pivot the end gate about the upper edges of the upper hooks 14 as an axis, to carry the outer flanges of the channel bars 13 out of engagement with the hooks 14 and remove the end gate from the wagon box. As the upper edge of the end gate is swung downwardly, the lower edge thereof will not bind against the posts 9, due to the fact that the lower inner edge of the gate is rounded. When the upper end gate is removed in this manner, a portion of the load in the wagon box may be dumped from the wagon. The lower end gate may then be removed in the same manner as the upper end gate, whereupon the remainder of the load in the wagon may be removed from the wagon box. Two end gates will have an advantage over a single end gate, inasmuch as the load from the wagon box may be removed one portion at a time, and the lower end gate will act to retain a portion of the load in the wagon box until the upper portion of the load is removed. It will be understood that, if desired, but one end gate need be used, or, if desired, more than two end gates may be used.

In resetting the end gates in the wagon, and locking the same in place, the lower end gate will be first placed in position so that the lower hooks 14 extend over the outer flanges on the channel bars 13, whereupon the lever 12 will be swung downwardly from the upwardly raised position until the hook 29 is engaged beneath the link 22. As the lever is swung, the bolts 15 will be slid inwardly in a horizontal plane and will be engaged again within the notches 20 of the angle brackets 19. The arcuate construction of the inner end of the link 22 will permit the link to be carried upwardly and around the pivot 25, so that the link will not strike the same until the lever has been swung slightly past a dead center position, whereupon the arcuate portion of the link will engage the washer 26 to limit the downward swinging movement of the lever. As the lever 24 is swung downwardly, the hooks will tightly clamp the angle brackets 19 and force the sides 8 of the wagon box against the outer ends of the end gate 12. The notches 20 in the angle brackets 10 will prevent vertical movement of the bolts 15 and, accordingly, no vertical displacement of the end gate can take place. After the lower end gate is in place, the upper one may be applied to the wagon box in a similar manner.

In order that the lock may be applied to wagon boxes of different widths, the inventor forms a series of spaced pivot holes 30 at the outer ends of one of the links, such as the link 21. In applying the lock to a wagon box, the pivot securing the link 21 to the left bolt 15 may be placed through the particular hole 30 which will permit the hook ends of the bolts 15 to tightly clamp angle brackets 19 when the lever 24 is downwardly swung. The pivot 25 will then be secured in the end gate 12 at whatever central point in the end gate the pivot holes for the pivot 25 will be alined with. It will thus be seen that without variance, the lock construction of the device can be applied to wagon boxes of various sizes. The device has been demonstrated in actual practice and has been found to be very successful for the purposes described. It is cheap in construction and simple in operation.

It will, of course, be understood that various changes may be made in the form, details, arrangement and proportions of the various parts without departing from the scope of the present invention.

What is claimed is:

1. The combination with a wagon box, posts secured to the sides of the wagon box adjacent their rear ends but spaced from the extreme ends thereof, and an end gate for said box, of a lock for releasably securing the end gate to the wagon box, comprising angle bars disposed at the ends of the rear side of said end gate, bolts horizontally slidable through flanges of said angle bars, links pivoted at their outer ends to the inner ends of said bolts, a centrally disposed lever pivoted on said end gate, and to which the inner ends of said links are pivoted at points oppositely disposed relative to the pivot point of said lever, means secured to said wagon box with which said bolts are adapted to be engaged when said lever is swung in one direction, means secured to said wagon box for engagement with said end gate adjacent its lower end, said end gate being rounded at its inner and lower edge, to permit the same to be swung downwardly from its upper edge about said last mentioned means as a pivot, without striking said posts when said bolts are released from said engaging members.

2. The combination with a wagon box and an end gate therefor, of a lock for releasably securing the end gate to the wagon box, comprising angle bars disposed at the ends of the rear side of said end gate, bolts horizontally slidable through flanges of said angle bars, links pivoted at their outer ends to the inner ends of said bolts, a centrally disposed lever pivoted on said end gate and to which the inner ends of said links are pivoted at points oppositely disposed relative to the pivot point of said lever, means secured to said wagon box with which said bolts are adapted to be engaged when said lever is swung in one direction and hooks secured to said wagon box and with which the lower portions of said angle bars are adapted to be engaged.

3. The combination with a wagon box, stop members secured to the sides of the wagon box adjacent their rear ends but spaced from the extreme rear ends thereof, and an end gate for said box adapted to fit against said stop members, of a lock for releasably securing the end gate to the wagon box comprising an operating lever pivotally mounted on said end gate, a pair of locking members mounted in the end gate for travel outwardly and inwardly from the ends of the gate, a pair of links respectively pivoted at their outer ends to the inner ends of said locking members, and respectively pivoted at their inner ends to said lever at points oppositely disposed relative to the pivot point about which said lever may swing, means secured to said wagon box for engagement with said end gate adjacent its lower end, said end gate being rounded at its inner and lower edge to permit the same to be swung downwardly from its upper edge about said last mentioned means as an axis without binding against said stop members.

4. The combination with a wagon box and an end gate therefor, of a lock for releasably securing the end gate to the wagon box, comprising angle bars disposed at the ends of the rear side of said end gate, bolts horizontally slidable through flanges of said angle bars, links pivoted at their outer ends to the inner ends of said bolts and a centrally disposed lever pivoted on said end gate and to which the inner ends of said links are pivoted at points oppositely disposed relative to the pivot point of said lever, means secured to said wagon box with which said bolts are adapted to be engaged when said lever is swung in one direction, said bolts having hooks formed at their outer ends, and angle members secured to the outer sides of said wagon box and having notches formed on their outer flanges within which said hooks are adapted to fit to prevent vertical movement of the bolts and end gate when secured.

In testimony whereof I affix my signature.

VERN F. HUTCHINS.